J. F. MARSHALL.
ROD JOINT.
APPLICATION FILED JULY 9, 1919.
1,347,111.   Patented July 20, 1920.
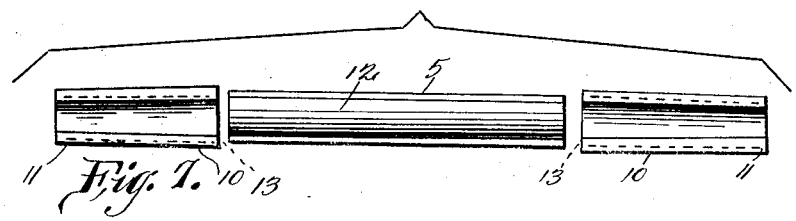
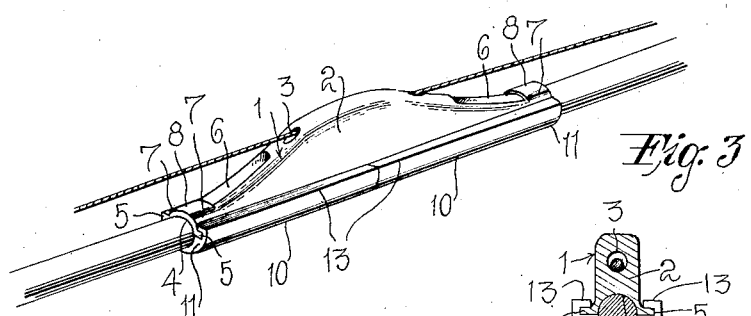
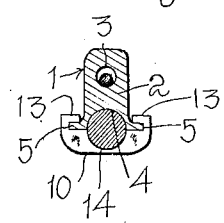
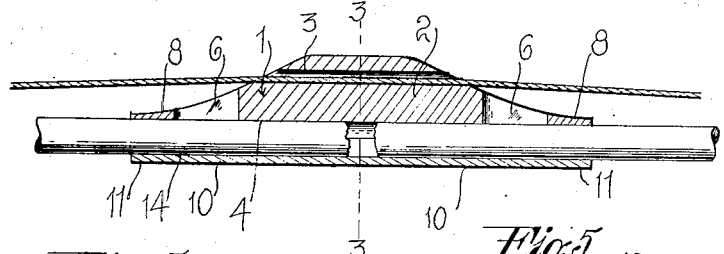
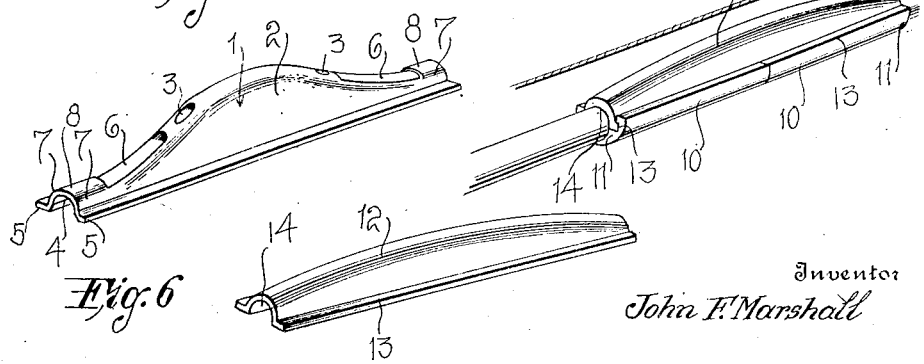
Inventor
John F. Marshall
By Watson E. Coleman
Attorney

UNITED STATES PATENT OFFICE.

JOHN F. MARSHALL, OF ASHLAND, WISCONSIN.

ROD-JOINT.

1,347,111.  Specification of Letters Patent.  Patented July 20, 1920.

Application filed July 9, 1919. Serial No. 309,661.

*To all whom it may concern:*

Be it known that I, JOHN F. MARSHALL, a citizen of the United States, residing at Ashland, in the county of Ashland and State of Wisconsin, have invented certain new and useful Improvements in Rod-Joints, of which the following is a specification, reference being had to the accompanying drawings.

This invention relates to an improved line guide and ferrule for fishing rods, and one of the objects of the invention is to provide a line guide adapted to be detachably clamped on the side of the fishing rod for the reception of the fishing line to guide the same from the reel to the end of the rod and vice versa.

A further object of the invention is to provide means for clamping a line guide or a ferrule on a fishing rod, the latter, in case the rod is broken, for the purpose of mending the same, and the former as a guide for the fishing line.

A further object of the invention is to provide a line guide comprising a body having a guide for the line and having its opposite ends provided with opposed yieldable parts adapted to be drawn closely in contact with the fishing rod, to clamp the guide in place, the clamps being slidably connected to the opposed yieldable parts, and capable of being moved toward each other, substantially to the center of the guide. In other words, the guide and the clamps are provided with inter-engaging tongue and groove connections, whereby the clamps may be secured to the guide, to hold the same on the rod.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of a portion of a fishing rod showing the improved line guide as mounted thereon.

Fig. 2 is a longitudinal sectional view.

Fig. 3 is a cross-sectional view on line 3—3 of Fig. 2.

Fig. 4 is a detail perspective view of the line guide.

Fig. 5 is a perspective view of a portion of the fishing rod, showing the broken or severed parts thereof united, by means of a ferrule and the clamps.

Fig. 6 is a detail view of the ferrule.

Fig. 7 discloses collective plan views of the ferrule 12 and the clamps 10, showing them in position to engage the ferrule.

Referring more especially to the drawings, 1 designates a line guide, which comprises a body portion 2, through which a bore 3 is formed, for the reception of a fishing line, from the end of the fishing rod to the reel (not shown). The body 2 is provided with a longitudinally extending groove 4 on one edge, to receive a portion of the cylindrical fishing or other rod. The flanges 5 adjoining the groove are comparatively thin and capable of yielding. In fact, these flanges are bent to extend laterally from the outer faces of the sides of the guide, so as to frictionally fit into the grooves of the clamps. The opposite end portions of the guide are slotted as shown at 6, thereby causing the opposing yieldable parts 7 to be formed. The end portions of the parts 7 are integrally connected by an overlying strip or arch 8, to prevent excessive spreading of the parts. However, this arched piece or strip is capable of bowing outwardly when the opposing parts are brought toward each other in contact with the fishing rod. Clamps 10 are provided, which are constructed from yieldable spring sheet or tubular metal, and are semi-circular in cross-section. These clamps are tapered, and are provided with overlying flanges 11 corresponding in shape or contour in cross-section with the shape of the flanges of the guide, and are adapted to engage the flanges of the guide, thereby drawing the flanges of the guide toward each other and in contact with the cylindrical surface of the rod, hence clamping the guide in position.

In order to mend broken fishing or other rods a ferrule 12 is provided. This ferrule may be any suitable length and is constructed of yieldable sheet or tubular metal, semicircular in cross-section, and the opposite sides of the ferrule are provided with flanges 13. When mending a broken fishing or other rod, the ferrule is arranged so that its concavity 14 will receive the broken end parts of the rod, after which the clamps are arranged in position, so that their flanges will frictionally receive the flanges of the ferrule, thereby clamping the two parts of the rod together. In fact, the line guide may be used as a coupling device for mending a broken fishing or other rod as well as a ferrule.

The invention having been set forth, what is claimed as new and useful is:

1. In a device as set forth, the combination with a body member having on one edge a longitudinally extending groove semi-circular in cross-section, for the reception of a rod, said body having opposite yieldable parts provided with lateral yieldable flanges, of tapered clamps semi-circular in cross-section to fit the rod and provided with overlying grooved flanges, to coöperatively receive the flanges of the body member, the end portions of the body member having opposing yieldable parts, which are drawn toward each other and in contact with the rod, as the clamps are moved into engagement with the body member, the ends of the opposing yieldable parts having an arched strip integrally connecting said parts.

2. In a device as set forth, the combination with a body member having on one edge a longitudinally extending groove semi-circular in cross-section, for the reception of a rod, said body having opposite yieldable parts forming sides of said groove, said opposite yieldable parts having yieldable extensions protruding in opposite directions and being spaced, yieldable arch straps connecting the ends of said extensions, said extensions and the opposite yieldable parts having laterally extending flanges, of tapered clamps semi-circular in cross-section fitting the rod and provided with overlying grooved flanges to engage the first flanges, and acting to draw the extensions toward each other and in contact with the rod, and causing the clamping actions of the arch straps on the rod, to hold the body member fixedly in position on the rod.

3. In a device as set forth, the combination with a body member having on one edge a longitudinally extending groove semi-circular in cross section, for the reception of adjacent severed ends of a rod, said body having opposite yieldable parts provided with yieldable flanges, of tapered clamps semi-circular in cross-section to support the rod and provided with overlying grooved flanges, to coöperatively frictionally receive the flanges of the body member, the end portions of the opposite yieldable parts being forced toward and adapted to bear upon the diametrically opposite sides of the rod as the tapered clamps are forced into frictional coöperative engagement with the yieldable flanges of the body, thereby clamping the severed end parts of the rod in axial alinement.

In testimony whereof I hereunto affix my signature in the presence of two witnesses.

JOHN F. MARSHALL.

Witnesses:
JOHN GARVIN,
WM. S. MATHEWS.